(12) United States Patent
Jäger et al.

(10) Patent No.: US 12,521,741 B2
(45) Date of Patent: Jan. 13, 2026

(54) DEVICE FOR GENERATING A $CO_2$ SNOW JET

(71) Applicant: ACP SYSTEMS AG, Zimmern ob Rottweil (DE)

(72) Inventors: Felix Jäger, Stockach (DE); Jonas Gude, Ditzingen (DE)

(73) Assignee: ACP SYSTEMS AG, Zimmern ob Rottweil (DE)

( * ) Notice: Subject to any disclaimer, the term of this patent is extended or adjusted under 35 U.S.C. 154(b) by 873 days.

(21) Appl. No.: 17/441,401

(22) PCT Filed: Mar. 24, 2020

(86) PCT No.: PCT/EP2020/058112
§ 371 (c)(1),
(2) Date: Sep. 21, 2021

(87) PCT Pub. No.: WO2020/200909
PCT Pub. Date: Oct. 8, 2020

(65) Prior Publication Data
US 2022/0168762 A1    Jun. 2, 2022

(30) Foreign Application Priority Data
Mar. 29, 2019 (DE) ............ 10 2019 108 289.7

(51) Int. Cl.
*B05B 7/14* (2006.01)
*B05B 12/18* (2018.01)
(Continued)

(52) U.S. Cl.
CPC ............ *B05B 7/1486* (2013.01); *B05B 12/18* (2018.02); *B08B 7/0021* (2013.01); *B08B 7/0092* (2013.01); *C01B 32/55* (2017.08)

(58) Field of Classification Search
CPC ..... B05B 7/1486; B05B 12/18; B08B 7/0021; B08B 7/0092
See application file for complete search history.

(56) References Cited

U.S. PATENT DOCUMENTS

| 1,993,696 A | 3/1935 | Allen et al. |
| 2,666,279 A * | 1/1954 | Chalom ............ B24C 5/04 |
| | | 451/102 |

(Continued)

FOREIGN PATENT DOCUMENTS

| CN | 1681623 A | 10/2005 |
| DE | 102016123816 A1 | 6/2018 |

(Continued)

OTHER PUBLICATIONS

International Search Report and Written Opinion from PCT/EP2020/058112 mailed Jun. 8, 2020 along with the English translation.

(Continued)

*Primary Examiner* — Steven M Cernoch
(74) *Attorney, Agent, or Firm* — Dilworth & Barrese, LLP

(57) ABSTRACT

The invention relates to a device for generating a $CO_2$ snow jet, comprising an expansion channel (6) which extends in a flow direction (14) for generating a $CO_2$ gas/$CO_2$ snow mixture based on liquid $CO_2$, said expansion channel having an inlet opening (18) for supplying liquid $CO_2$ and an outlet opening (22) for discharging the $CO_2$ gas/$CO_2$ snow mixture. The device also comprises a nozzle for generating an outer jet which surrounds and accelerates the $CO_2$ gas/$CO_2$ snow mixture discharged from the outlet opening of the expansion channel. The expansion channel has multiple channel sections (36a, 36b, 36c, 36d, 36e) arranged one behind the other in the flow direction, wherein the expansion channel cross section (40) that lies on a plane orthogonal to the flow direction changes locally in a particular transition or (Continued)

transition region (38a, 38b, 38c, 38d, 38e, 38f) between the channel sections, and the expansion channel (6) cross section (46d) at the upstream end (48d) of a particular channel section (36d) is larger than the expansion channel (6) cross section (46c) at the upstream end (48c) of the channel section (36c) arranged upstream of said channel section (36d) in the flow direction (14).

9 Claims, 4 Drawing Sheets

(51) Int. Cl.
    *B08B 7/00*        (2006.01)
    *C01B 32/55*      (2017.01)

(56) References Cited

U.S. PATENT DOCUMENTS

| | | |
|---|---|---|
| 5,125,979 A | 6/1992 | Swain et al. |
| 5,679,062 A | 10/1997 | Goenka |
| 6,851,627 B2 * | 2/2005 | Hashish .................... B24C 5/04 |
| | | 239/596 |
| 7,762,869 B2 | 7/2010 | Yoon |
| 10,092,917 B2 * | 10/2018 | Zeeb .................... B05B 7/0861 |
| 2005/0266777 A1 | 12/2005 | Yoon |
| 2006/0011734 A1 | 1/2006 | Kipp |
| 2006/0124156 A1 | 6/2006 | Jackson |
| 2008/0092933 A1 | 4/2008 | Tameishi |
| 2009/0039178 A1 | 2/2009 | Yoon |
| 2010/0170965 A1 | 7/2010 | Broecker |
| 2015/0196921 A1 | 7/2015 | Lehnig |
| 2020/0070309 A1 | 3/2020 | Kaya |

FOREIGN PATENT DOCUMENTS

| | | |
|---|---|---|
| GB | 507776 A | 6/1939 |
| KR | 100751041 B1 | 8/2007 |
| KR | 2016-0022725 A | 3/2016 |
| TW | 201012544 A | 4/2010 |
| WO | 0074897 A1 | 12/2000 |
| WO | 02075799 A1 | 9/2002 |
| WO | 2004033154 A1 | 4/2004 |
| WO | 2015109101 A1 | 7/2015 |

OTHER PUBLICATIONS

German Examination Report dated Feb. 20, 2020.

* cited by examiner

DEVICE FOR GENERATING A $CO_2$ SNOW JET

This application claims priority to German Patent Application No. 10 2019 108 289.7 filed on Mar. 29, 2019, the contents of which are incorporated by reference herein in their entirety.

The invention relates to a device for generating a $CO_2$ snow jet, comprising an expansion channel which extends in a flow direction for generating a $CO_2$ gas/$CO_2$ snow mixture based on liquid $CO_2$, said expansion channel having an inlet opening for supplying liquid $CO_2$ and an outlet opening for discharging the $CO_2$ gas/$CO_2$ snow mixture. The device also comprises a nozzle for generating an outer jet which surrounds and accelerates the $CO_2$ gas/$CO_2$ snow mixture discharged from the outlet opening of the expansion channel.

A device of this type is known for example from WO 00/74897 A1.

Such devices have proven themselves in practice for the gentle cleaning of surfaces, for example of workpiece surfaces, before painting or coating processes or of functional surfaces in the semiconductor industry and in medical technology. In particular, surface cleaning by means of a $CO_2$ snow jet (so-called. "$CO_2$ snow blasting") allows a dry (water-free), solvent-free, and residue-free removal of filmic and/or particulate impurities (e.g. dust, ablation residues, residues of cutting emulsions, fingerprints, etc.).

To generate a $CO_2$ snow jet, liquid $CO_2$ (carbon dioxide) is fed to the expansion channel via the inlet opening at an output pressure of usually around 60 bar or, if it is supplied from low-pressure tanks, around 20 bar. The pressure drops from the outlet pressure at the inlet opening to ambient pressure (usually 1 bar) at the outlet opening over a length of the expansion channel. As the pressure falls, a step-by-step phase conversion from liquid $CO_2$ to gaseous $CO_2$ takes place with simultaneous cooling of the mixture. If the pressure falls below the triple point of $CO_2$ (5.185 bar), the remaining liquid phase is at least partially converted into solid $CO_2$ in the form of snow crystals, so-called $CO_2$ snow. $CO_2$ "snow" is therefore $CO_2$ in a solid aggregate state and in particular not "snow" in the sense of frozen water. The resulting $CO_2$ snow crystals are entrained by the $CO_2$ gas accelerated as a result of expansion and are accelerated and discharged together with the $CO_2$ gas as $CO_2$ gas/$CO_2$ snow mixture from the outlet opening. The $CO_2$ gas/$CO_2$ snow mixture is then bundled by the outer jet formed by the nozzle and further accelerated to a $CO_2$ snow jet.

The cleaning effect of a $CO_2$ snow jet when it hits a surface is substantially based on four mechanisms: 1. Embrittlement of impurities through rapid cooling (sublimation point of $CO_2$ snow at atmospheric pressure: $-78.5°$ C.); 2. Abrasion through momentum transfer (accelerated $CO_2$ snow crystals transfer pressure and shear forces when they hit the surface); 3. Chemical dissolution of impurities, e.g. of adsorption compounds (in the course of the impact of $CO_2$ snow crystals on a surface, $CO_2$ can be converted into a supercritical state; in this state, $CO_2$ is a good chemical solvent); 4. Impurities are thrown away by an increase in volume (approx. 500 times) during the sublimation of $CO_2$ from the solid phase into the gas phase.

From WO 02/075799 A1 and also from U.S. Pat. No. 7,762,869 B2, non-generic devices for generating a $CO_2$ snow jet are known in which the phase conversion of liquid $CO_2$ into $CO_2$ snow only takes place in a mixing chamber, in which liquid $CO_2$ is expanded into a carrier gas which is also supplied. This $CO_2$ snow/carrier gas mixture is conveyed further through successive Venturi nozzles and treated physically, as a result of which the proportion of snow in the mixture increases. DE 10 2016 123 816 A1 also shows a device of this type.

$CO_2$ snow blasting is to be distinguished from the often more abrading $CO_2$ dry ice blasting in which dry ice pellets (pellets of solid $CO_2$, i.e. in particular no $CO_2$ snow crystals) are accelerated in a blasting system and are irradiated to a workpiece to be cleaned. While dry ice pellets are usually produced in a pelletizer provided separately by the blasting system and then fed to the blasting system in batches, $CO_2$ snow blasting allows continuous operation and is therefore particularly suitable for automation. US 2010/0170965 A1 and WO 2015/109101 A1 relate to and disclose pellet blasting devices in which dry ice pellets guided in a jet are further comminuted by a grid-like screen.

The object of the present invention is to improve a device of the type mentioned at the outset in such a way that a higher cleaning effect is achieved with $CO_2$ snow blasting. The device should be able to be operated in an economical manner.

This object is achieved according to the invention in a device of the type mentioned at the outset in that the expansion channel has multiple channel sections arranged one behind the other in the flow direction, wherein the expansion channel cross section that lies on a plane orthogonal to the flow direction changes locally in a particular transition or transition region between the channel sections, and the expansion channel cross section at the upstream end of a particular channel section is larger than the expansion channel cross section at the upstream end of the channel section arranged upstream of said channel section in the flow direction.

Such a configuration makes it possible to increase the momentum of the $CO_2$ snow jet, in particular of the $CO_2$ snow particles, and in this way to increase the abrasiveness when the $CO_2$ snow jet hits a surface to be cleaned. This means that even stubborn impurities on the surface can be reliably removed. In particular, a configuration of the device according to the invention makes it possible to increase the momentum of the $CO_2$ snow particles already in the expansion channel, which favors an economical mode of operation of the device.

According to the invention, it was recognized that a two-phase flow arises in the course of the phase conversion of liquid $CO_2$ into gaseous $CO_2$ that takes place in the expansion channel, the liquid phase flowing annularly at the edge of the expansion channel (fluid flow) and the gas phase flowing in a central region of the expansion channel (gas flow). It has also been found that the gas flow has a flow velocity that is approximately 10 to 100 times higher than the fluid flow. The gas phase cannot be used to produce $CO_2$ snow; it is lost.

It goes without saying that in order to operate a device according to the invention, liquid $CO_2$ can be fed to the expansion channel at different outlet pressures, in particular at an outlet pressure in a range from approximately 5 to 70 bar.

Because the expansion channel cross section changes in the case of a device according to the invention in a particular transition or transition region between the channel sections, a pressure jump arises at these transitions or transition regions, which results in turbulence in the fluid and gas flow and thus results in an intermixing of gas and liquid phases. In the course of the intermixing of the gas and liquid phases, the liquid phase is accelerated by the faster flowing gas phase. Snow particles resulting from the accelerated liquid phase with further expansion thus emerge from the outlet opening of the expansion channel at increased velocity. The increase in momentum of the snow particles associated with the increase in velocity results in greater abrasiveness when the snow particles hit a surface and consequently results in an improved cleaning effect.

Due to the fact that the snow particles already have a comparatively high velocity when discharged from the expansion channel, a lower acceleration of the snow particles by the outer jet is necessary in comparison to the devices known from the prior art in order to achieve a predetermined target velocity. As a result, the gas flow through the nozzle that is required to generate the outer jet can be reduced, whereby the operating costs of the device can be reduced.

The intermixing of the liquid phase and the gas phase brought about by the change in cross section in the particular transition or transition region also favors the conversion of liquid $CO_2$ into $CO_2$ snow. In this way, the proportion of $CO_2$ snow in the $CO_2$ snow jet can be increased, which further increases the abrasiveness when the $CO_2$ snow jet hits a surface to be cleaned.

In addition, the pressure jump and the associated turbulence in the flows at the particular transition or transition region can favor the formation of larger liquid droplets and, as a result, the formation of larger snow crystals, whereby a momentum transfer is increased when it hits a surface to be processed. In this way, the cleaning effect of $CO_2$ snow blasting can be further improved.

In the scope of a preferred configuration, a change in cross section in the particular transition can take place suddenly, i.e. the transition in particular might not have an extension in the flow direction. The intermixing of the gas phase and the liquid phase is then particularly effective, since the sudden changes in cross section bring about particularly strong pressure jumps and turbulences in the two-phase flow.

It is also provided according to the invention that the expansion channel cross section at the upstream end, i.e. at the end, which is upstream in the flow direction, of a particular channel section is larger than the expansion channel cross section at the upstream end of the channel section arranged upstream of said channel section in the flow direction. The expansion channel cross section at the upstream end of a particular channel section thus becomes larger from channel section to channel section, as seen in the flow direction. In this respect, the expansion channel widens over the entire extension thereof, viewed in the flow direction. The expansion channel cross section at the outlet opening thereof is preferably larger than the expansion channel cross section at the inlet opening thereof. In this way, the risk of the expansion channel becoming blocked by resulting $CO_2$ snow crystals, in particular by larger $CO_2$ snow agglomerates, can be reduced. This favors reliable functioning of the device.

In the scope of a preferred configuration, the particular transition can have an extension in the flow direction. The particular transition is then designed as a transition region which interconnects the particular channel sections. In this case, the expansion channel cross section can change, in particular continuously, along the extension of the particular transition region in the flow direction. For example, it can be provided that the expansion channel tapers or widens conically in the particular transition region.

In order to generate a stable outer jet and an effective acceleration of the $CO_2$ gas/$CO_2$ snow mixture, it also proves to be advantageous if the nozzle for generating the outer jet is designed as an annular nozzle, in particular which concentrically surrounds the expansion channel. It proves to be particularly advantageous if the nozzle is designed as a supersonic nozzle (Laval nozzle). In this way, the velocity of the snow particles and thus a momentum that can be transmitted to a surface can be increased further. Dry gases, for example air or nitrogen, in particular ultra-pure air or ultra-pure nitrogen, prove to be particularly advantageous as the carrier gas for the outer jet.

In the scope of a preferred embodiment, the expansion channel cross section can be reduced in the flow direction at least in the case of some transitions or transition regions, preferably in each transition or transition region (claim 2). It proves to be advantageous if the cross section in a particular transition or transition region is reduced by 25% to 75%, more preferably by 40% to 60%. In this respect, a minimum cross-sectional surface of a particular transition or transition region lying on a plane orthogonal to the flow direction can be between 75% and 25%, preferably between 60% and 40%, of the cross-sectional surface at the downstream end, i.e. at the, in the flow direction, upstream end of the channel section arranged upstream of the particular transition or transition region in the flow direction. A larger change in cross section in terms of amount results in a larger pressure jump, which is advantageous for effective intermixing of the gas and liquid phases. A smaller change in cross section, however, is advantageous for a higher flow rate of the $CO_2$ gas/$CO_2$ snow mixture.

It proves to be particularly advantageous if the expansion channel tapers radially inward in the particular transition or transition region (claim 3). This makes it possible to guide the liquid phase, which flows in particular annularly at the edge of the expansion channel, in a particularly effective manner in the direction of the gas flow, which favors the intermixing of the gas and liquid phases.

Furthermore, it proves to be particularly advantageous if the particular transition or transition region forms an annular screen, i.e. the expansion channel tapers radially inwardly over a circumference of the expansion channel (claim 4). The intermixing of the annularly flowing liquid phase with the gas phase is particularly effective in this case. A screen surface of a particular screen can serve as a collision surface for snow particles that have already been formed. When they hit a screen surface, the snow particles can be compacted and grow together to form larger snow agglomerates, which increases the abrasiveness when the compacted snow particles or the snow agglomerates hit a surface.

In a preferred embodiment, the screen surface can be oriented orthogonally to the flow direction. Then the expansion channel tapers suddenly. In other preferred embodiments, the screen surface can be oriented inclined to the flow direction. The particular transition can then be designed as a transition region having an extension in the flow direction. The expansion channel can preferably taper conically in the particular transition region.

In the scope of an alternative preferred configuration, the expansion channel cross section can be increased in the flow direction at least in the case of some transitions or transition regions, preferably in each transition or transition region (claim 5). The increase in cross section brings about turbulences in the two-phase flow, which causes particularly effective intermixing of the liquid phase and the gas phase. Furthermore, by locally widening the expansion channel, the liquid $CO_2$ can further expand, which favors a conversion of the liquid $CO_2$ into $CO_2$ snow.

It proves to be particularly advantageous if a particular transition region is designed as a bulge of any shape, in particular oval, or in the shape of a bubble or spherical segment (claim 6). In this way, a particularly strong turbulence in the flow and thus good intermixing of the liquid and gas phases is brought about.

It also proves to be advantageous if the particular transition or transition region extends in the flow direction over a length of 0 to 5.0 mm, more preferably over a length of 0 to 4.0 mm, more preferably over a length of 0 to 3.0 mm, more preferably over a length of 0 to 2.0 mm, in particular over a length of 1.0 to 2.0 mm (claim 7).

In particular, such a configuration makes it possible to make the expansion channel relatively long, so that a relatively large proportion of the liquid $CO_2$ can be converted into $CO_2$ snow and the resulting $CO_2$ snow crystals can grow into larger crystals—without a flow through the expansion channel being blocked. In this way, the proportion of $CO_2$ snow in the $CO_2$ snow jet, in particular the proportion of larger snow agglomerates, can be increased, which increases the momentum of the $CO_2$ snow jet and thus improves the cleaning effect.

Regarding simple production, regardless of any widening of the expansion channel along the extension thereof in the flow direction, it is advantageous if at least some channel sections, in particular all channel sections, have a constant cross section over their particular extension in the flow direction (claim 8).

According to another embodiment, it can prove to be advantageous if at least some channel sections, in particular all channel sections, possibly with the exception of an eventually provided feed section, widen over their particular extension in the flow direction, i.e. the cross section is larger at the downstream end of a particular channel section than the cross section at the upstream end of this channel section (claim 9). It is assumed that a widening of this type of the channel sections brings about a further acceleration of the flow according to the principle of the Laval nozzle, whereby the velocity and thus the momentum of the snow crystals can be increased further. Furthermore, the risk of the expansion channel becoming blocked by resulting $CO_2$ snow is further reduced by widening the channel sections. It is particularly preferred if the particular channel sections widen continuously, in particular conically.

For an efficient conversion of liquid $CO_2$ into $CO_2$ snow, it also proves to be advantageous if the expansion channel has a maximum cross-sectional surface of less than 5.0 mm$^2$, preferably less than 3.0 mm$^2$, more preferably less than 1.0 mm$^2$, more preferably less than 0.5 mm$^2$ on a plane orthogonal to the flow direction (claim 10).

It also proves to be advantageous if the expansion channel is formed by at least one cavity in a workpiece, in particular a cylindrical tubular body (claim 11). It is possible for the workpiece delimiting the expansion channel to be designed to be monolithic. For example, it is possible for a workpiece having a cavity to be produced using an additive manufacturing method (e.g. 3D printing). It is also possible for the workpiece to be composed of two or more workpiece halves which, in the assembled state, delimit a cavity. For example, it is possible that the workpiece halves are produced by means of a vacuum casting method and then joined together. It also proves to be advantageous if the workpiece is made from a plastics material.

The invention however also relates to a device (2) for generating a $CO_2$ snow jet (4), comprising an expansion channel (6) which extends in a flow direction (14) for generating a $CO_2$ gas/$CO_2$ snow mixture (8) based on liquid $CO_2$, said expansion channel (6) having an inlet opening (18) for supplying liquid $CO_2$ and an outlet opening (22) for discharging the $CO_2$ gas/$CO_2$ snow mixture (8). The device also comprises a nozzle (26) for generating an outer jet (28) which surrounds and accelerates the $CO_2$ gas/$CO_2$ snow mixture (8) discharged from the outlet opening (22) of the expansion channel (6). The expansion channel (6) has multiple channel sections (36a, 36b, 36c, 36d, 36e, 36f, 36g) arranged one behind the other in the flow direction (14), wherein the expansion channel (6) cross section (40) that lies on a plane orthogonal to the flow direction (14) changes locally in a particular transition or transition region (38a, 38b, 38c, 38d, 38e, 38f) between the channel sections (36a, 36b, 36c, 36d, 36e, 36f, 36g). Preferred developments of this device are the subject matter of the accompanying dependent claims.

Further details, features, and advantages of the invention can be found in the accompanying claims and the drawings and the following description of preferred embodiments of the device according to the invention.

In the drawing:

FIG. 2d is a perspective view of the tubular body half of the tubular body according to FIG. 2a;

FIG. 3c is a perspective view of the tubular body half of the tubular body according to FIG. 3a;

FIG. 4c is a perspective view of the tubular body half of the tubular body according to FIG. 4a.

FIG. 1 is a schematic view of an embodiment of a device, which is denoted as a whole by the reference sign 2 and is partially shown for generating a $CO_2$ snow jet 4.

Figure 1:
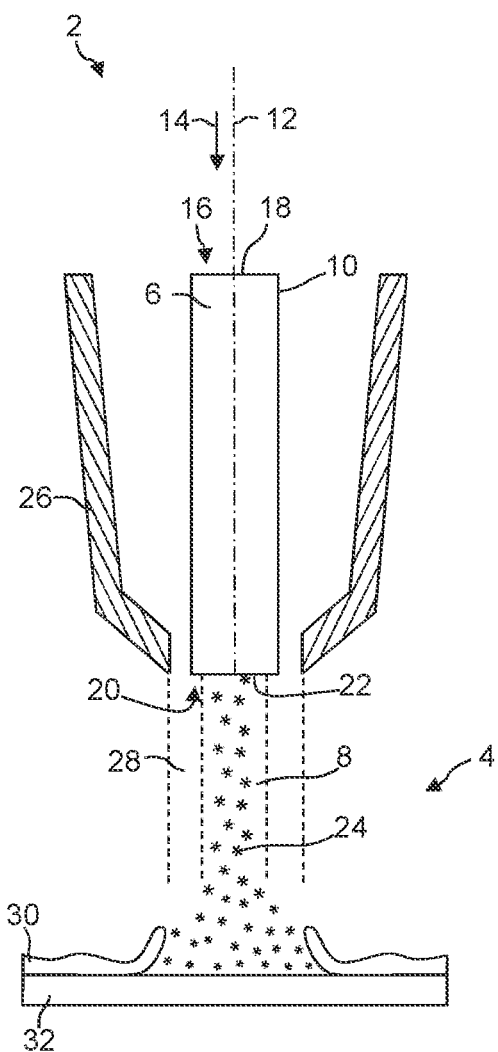
FIG. 1 is a schematic view of an embodiment of a device for generating a $CO_2$ snow jet in a partially sectioned view.

The device 2 has an expansion channel 6 which is used to generate a $CO_2$ gas/$CO_2$ snow mixture 8 based on liquid $CO_2$. In the case shown by way of example, the expansion channel 6 is formed by a cavity in a cylindrical tubular body 10. The tubular body 10 and the expansion channel 6 extend along a central axis 12 in a flow direction 14.

At the upstream end 16 thereof, i.e. at the end thereof which is upstream in the flow direction 14, the expansion channel 6 has an inlet opening 18 for supplying liquid $CO_2$.

The expansion channel 6 also has an outlet opening 22 at the downstream end 20 thereof, i.e. at the upstream end thereof in the flow direction 14, for discharging the $CO_2$ gas/$CO_2$ snow mixture 8 formed in the expansion channel 6.

To generate the $CO_2$ gas/$CO_2$ snow mixture 8, liquid $CO_2$ is fed, for example and preferably at an outlet pressure of approx. 60 bar or, when supplied from low-pressure tanks, of approx. 20 bar by device components (not shown) via the inlet opening 18 to the expansion channel 6 in the flow direction 14. Over the extension of the expansion channel 6 in the flow direction 14, the pressure drops from the outlet pressure at the inlet opening 18 to ambient pressure (approx.

1 bar) at the outlet opening 22. As the pressure falls, a step-by-step phase conversion from liquid $CO_2$ to gaseous $CO_2$ takes place with simultaneous cooling of the mixture. In the course of the phase conversion, a two-phase flow is formed, the liquid phase flowing annularly at the edge of the expansion channel 6 and the gas phase flowing in a central region of the expansion channel 6. If the pressure falls below the triple point of $CO_2$ (5.185 bar), the remaining liquid phase is converted step-by-step into solid $CO_2$ in the form of $CO_2$ snow crystals 22, so-called $CO_2$ snow. There are then three phases. The resulting $CO_2$ snow crystals 24 are entrained by the gas flow, accelerated and, together with the $CO_2$ gas, are discharged from the outlet opening 22 as a $CO_2$ gas/$CO_2$ snow mixture 8. As explained at the outset, larger snow crystals, in particular a larger proportion of snow, are formed by the changes in cross section and the pressure jumps caused thereby.

The device 2 also has a nozzle 26 for generating an outer jet 28 from a carrier gas, for example and preferably from ultra-pure air or ultra-pure nitrogen. In the case shown by way of example, the nozzle 26 is designed as an annular nozzle which preferably concentrically surrounds the tubular body 10. By way of example and preferably, the nozzle 26 can be designed as a Laval nozzle in a manner known per se. The outer jet 28 surrounds the $CO_2$ gas/$CO_2$ snow mixture 8 discharged from the outlet opening 22 of the expansion channel 6 and accelerates it to a $CO_2$ snow jet 4.

As explained above and in a manner known per se, the $CO_2$ snow jet 4 can be used to remove filmic and/or particulate impurities 30 from a workpiece surface 32.

FIG. 2a to 4c show different configurations of the expansion channel 6 in detail. In each of the illustrated configurations, the tubular body 10 delimiting the expansion channel 6 is, for example and preferably, formed from, preferably two, preferably identical, tubular body halves 34. FIG. 2a to 5b each show such a tubular body half 34 in different views. The tubular body halves 34 are produced, for example and preferably, from plastics material, for example in a vacuum casting method. The tubular body halves 54 can be joined to one another, for example, by means of ultrasonic welding, laser welding, gluing, crimping or by pressing the tubular body halves 54 into an outer tube.

In each of the configurations shown, the expansion channel 6 has a plurality of channel sections 36a, 36b, 36c, 36d, 36e, 36f, 36g arranged one behind the other in the flow direction 14. The expansion channel 6 also has transitions or transition regions 38a, 38b, 38c, 38d, 38e, 38f arranged between the particular channel sections 36a, 36b, 36c, 36d, 36e, 36f, 36g. In the transitions or transition regions 38a, 38b, 38c, 38d, 38e, 38f, the expansion channel 6 cross section 40 which lies on a plane orthogonal to the flow direction 14 changes locally. The change in cross section in the particular transition or transition region 38a, 38b, 38c, 38d, 38e, 38f each brings about a pressure jump, as a result of which turbulences are generated in the flow within the expansion channel 6, which mixes up the phases present in the expansion channel 6, in particular the $CO_2$ liquid phase and the $CO_2$ gas phase.

First of all, a particular channel section is considered: In the configuration according to FIG. 2a to 2d, the channel sections 36a, 36b, 36c, 36d, 36e widen conically over their particular extension in the flow direction 14. In front of these channel sections 36a, 36b, 36c, 36d, 36e, a feed section with a constant cross section is provided by way of example. By way of example and preferably, the channel sections 36a, 36b, 36c, 36d, 36e are designed as frustoconical, i.e. conically widening, cavities within the tubular body 10. As shown by way of example in FIG. 2b for the channel section 36c, the expansion channel 6 cross section 42c at the downstream end 44c of a particular channel section 36c is larger than the cross section 46c at the upstream end 48c of this channel section 36c.

Figure 2A:
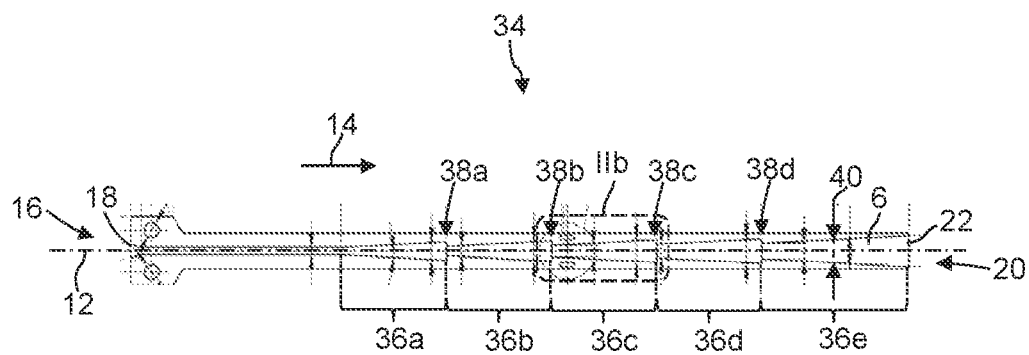
FIG. 2a is a side view of a tubular body half of a tubular body delimiting an expansion channel of the device according to FIG. 1 in a first configuration.
Figure 2B:
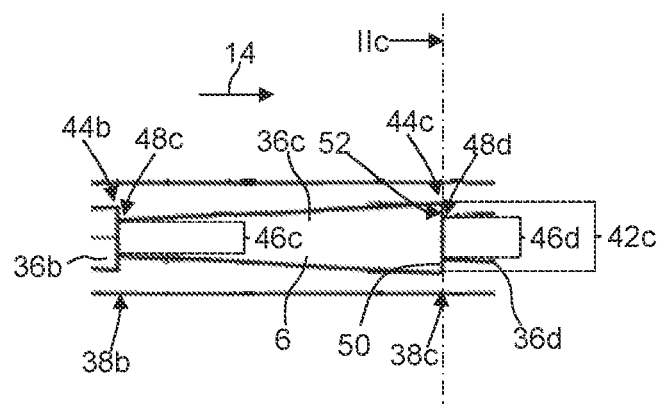
FIG. 2b is a section designated IIb in FIG. 2a in an enlarged view.

As shown by way of example in FIG. 2b for the channel sections 36c and 36d, in the present configuration the expansion channel 6 cross section 46d at the upstream end 48d of a particular channel section 36d is larger than the expansion channel 6 cross section 46c at the upstream end 48c of the channel section 36c arranged upstream of said channel section 36d in the flow direction 14. The expansion channel 6 cross section 46c,d at the upstream end 48c,d of a particular channel section 36c, 36d becomes therefore larger, viewed in the flow direction 14, from channel section 36c to channel section 36d.

Now the transitions between the channel sections are considered:

In a particular transition 38a, 38b, 38c, 38d between the channel sections 36a, 36b, 36c, 36d, 36e according to the configuration in FIG. 2a to 2d, the expansion channel 6 tapers suddenly radially inward. As shown by way of example in FIG. 2b for the channel sections 36c and 36d, the expansion channel 6 cross section 46d at the upstream end 48d of a particular channel section 36d is smaller than the expansion channel 6 cross section 42c at the downstream end 44c of the channel section 36c arranged upstream of this channel section 36d in the flow direction 14.

Figure 2C:
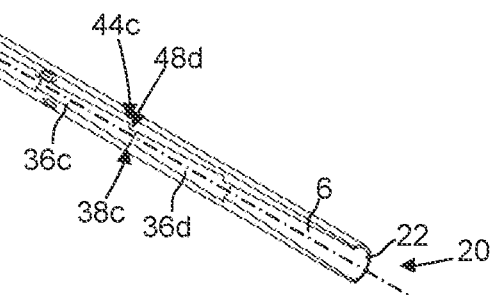
FIG. 2c is a sectional view of the section according to FIG. 2b along the section line IIc-IIc shown in FIG. 2b.
Figure 2D:
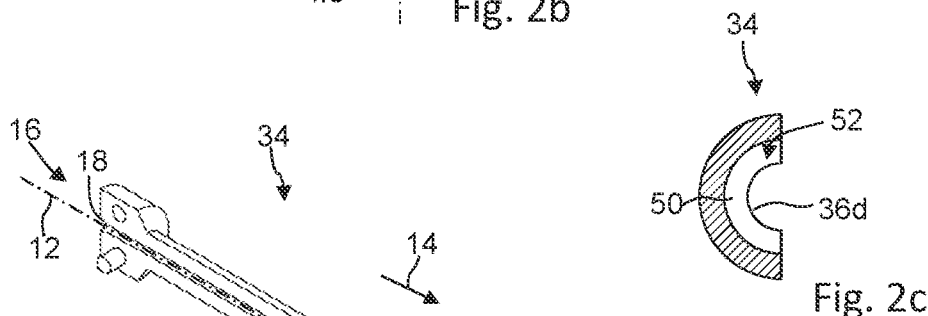

By way of example and preferably, the particular transition 38a, 38b, 38c, 38d in the present case each forms an annular screen 50, a screen surface 52 being oriented orthogonally to the flow direction 14 (see FIGS. 2b and 2c).

Figure 3A:
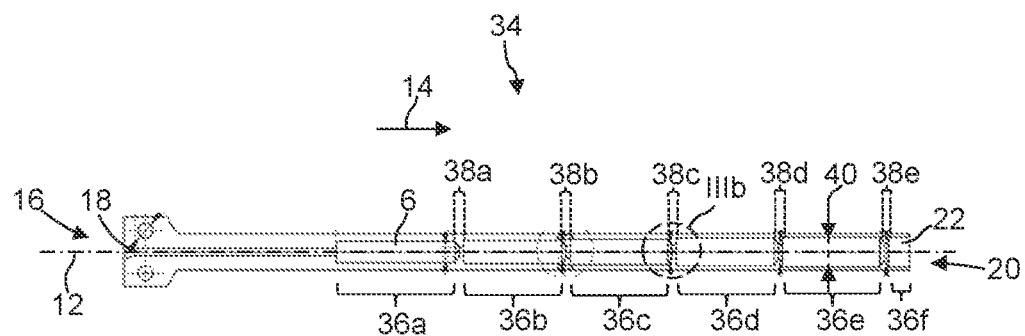
FIG. 3a is a side view of a tubular body half of a tubular body delimiting an expansion channel of the device according to FIG. 1 in a further configuration.
Figure 3B:
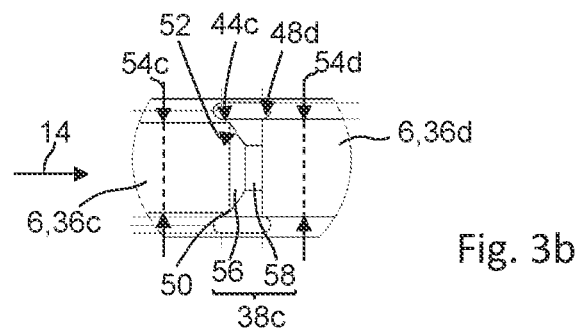
FIG. 3b is a section designated IIIb in FIG. 3a in an enlarged view.
Figure 3C:
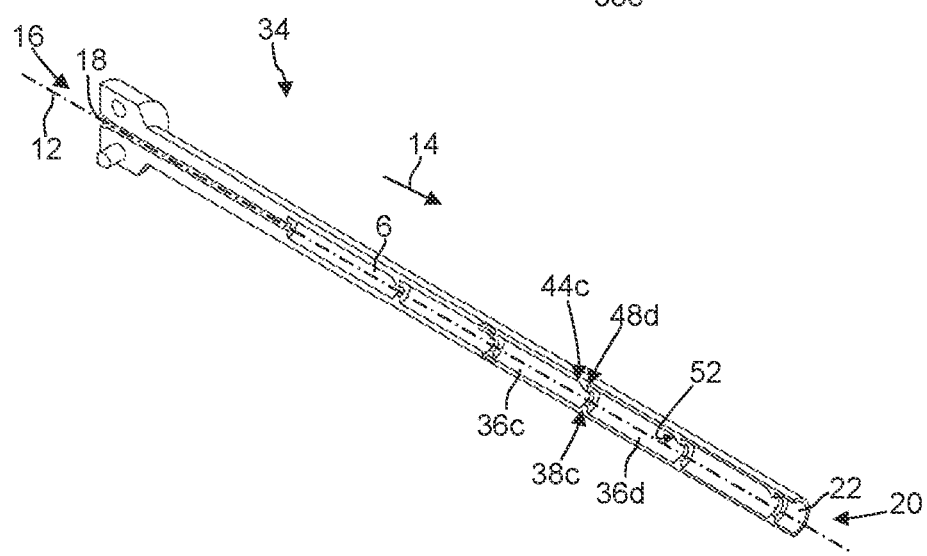

FIG. 3a to 3c show a further different configuration of the expansion channel 6, in which the channel sections 36a, 36b, 36c, 36d, 36e, 36f and a feed section provided by way of example have a constant cross section orthogonal to the flow direction 14 over their particular extension in the flow direction 14. As shown by way of example in FIG. 3b for the channel sections 36c and 36d, the cross section 54d of a channel section 36d arranged downstream in the flow direction 14 is larger than the cross section 54c of the channel section 36c arranged upstream of this channel section 36d in the flow direction 14. The particular channel sections 36a, 36b, 36c, 36d, 36e, 36f are designed, for example and preferably, as circular cylindrical cavities in the tubular body 10.

In the configuration according to FIG. 3a to 3c, the particular transitions 38a, 38b, 38c, 38d, 38e between the channel sections 36a, 36b, 36c, 36d, 36e, 36f are designed as transition regions 38a, 38b, 38c, 38d, 38e; they thus have in each case an extension in the flow direction 14. By way of example and preferably, each transition region 38a, 38b, 38c, 38d, 38e has a first section 56 which tapers conically inwards radially and a second cylindrical section 58 adjoining the conical section 56 in the flow direction 14 (in FIG. 3b shown by way of example for the transition region 38c). The particular transition regions 38a, 38b, 38c, 38d, 38e interconnect the channel sections 36a, 36b, 36c, 36d, 36e, 36f in terms of flow.

In the configuration according to FIG. 3a to 3c, the particular transition region 38a, 38b, 38c, 38d, 38e also forms an annular screen 50, a screen surface 52 being oriented inclined to the flow direction 14 (see FIG. 3b).

Figure 4A:
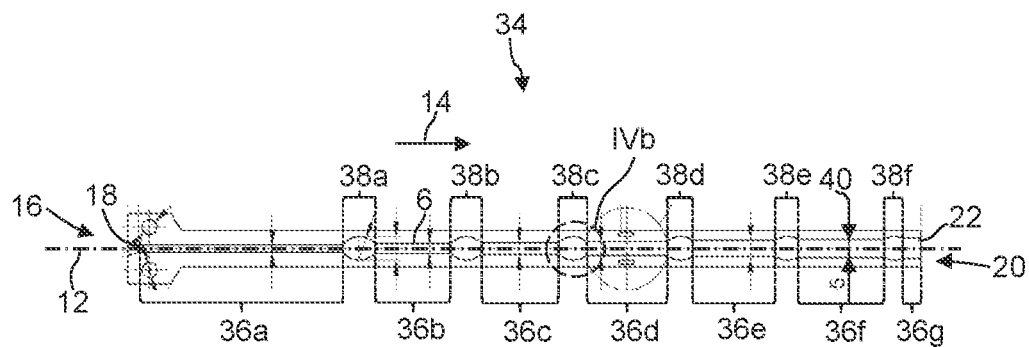
FIG. 4a is a side view of a tubular body half of a tubular body delimiting an expansion channel of the device according to FIG. 1 in a further configuration.
Figure 4B:
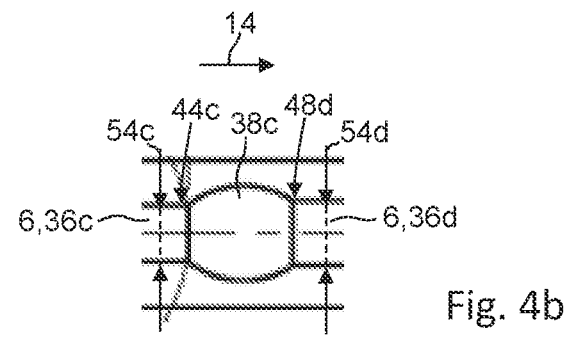
FIG. 4b is a section designated IVb in FIG. 4a in an enlarged view.
Figure 4C:
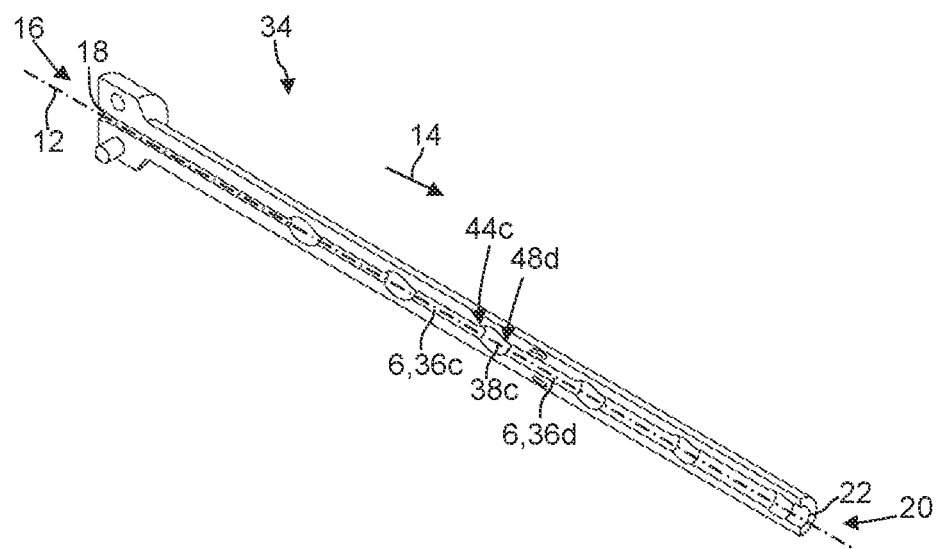

FIG. 4a to 4c show a further different configuration of the expansion channel 6, in which the expansion channel cross section in the particular transition region 38a, 38b, 38c, 38d, 38e, 38f is initially increased in the flow direction 14. By way of example and preferably, the particular transition region 38a, 38b, 38c, 38d, 38e, 38f is designed as an oval-like bulge (see FIG. 4b). Viewed in the flow direction 14, in the case shown by way of example, a particular extension of the transition regions 38a, 38b, 38c, 38d, 38e, 38f in the flow direction is reduced from transition region to transition region (see FIG. 4a).

The channel sections 36a, 36b, 36c, 36d, 36e, 36f, 36g each have a constant cross section over their particular extension in the flow direction 14 in the configuration shown in FIG. 4a to 4b, the cross section 54d of a channel section 36d arranged downstream in the flow direction 14 being larger, however, than the cross section 54c of the channel section 36c arranged upstream of this channel section 36d in the flow direction 14 (shown in FIG. 4b by way of example for the channel sections 36c and 36c).

The invention claimed is:

1. A device (2) for generating a CO2 snow jet (4), comprising an expansion channel (6) which extends in a flow direction (14) for generating a CO2 gas/CO2 snow mixture (8) based on liquid CO2, said expansion channel (6) having an inlet opening (18) for supplying liquid CO2 and an outlet opening (22) for discharging the CO2 gas/CO2 snow mixture (8), the device (2) comprising a nozzle (26) for generating an outer jet (28) which surrounds and accelerates the CO2 gas/CO2 snow mixture (8) discharged from the outlet opening (22) of the expansion channel (6), wherein the expansion channel (6) has multiple channel sections (36a, 36b, 36c, 36d, 36e, 36f, 36g) arranged one in front of the other in the flow direction (14), which widen continuously over an extension of each said channel section (36a, 36b, 36c, 36d, 36e, 36f, 36g) in the flow direction (14), an expansion channel (6) cross section (40) that lies on a plane orthogonal to the flow direction (14) tapers suddenly radially inwardly in transition between each said adjacent channel sections (36a, 36b, 36c, 36d, 36e, 36f, 36g) in the flow direction (14), to form an annular screen surface (50) to serve as a collision surface for snow particles that have already been formed, such that the snow particles, when they hit the screen surface are compacted and grow together to form larger snow agglomerates, the expansion channel cross section at an upstream end of each said channel section is smaller than the expansion channel cross section at a downstream end of a channel section arranged immediately upstream of each said channel section in the flow direction (14), and the expansion channel (6) cross section (46d) at the upstream end (48d) of each said channel section (36d) is larger than the expansion channel (6) cross section (46c) at the upstream end (48c) of the channel section (36c) arranged immediately upstream of each said channel section (36d) in the flow direction (14), the expansion channel (6) is formed by at least one cavity of a workpiece, said workpiece having a wall delimiting the expansion channel (6), the transition tapers suddenly radially inwardly with respect to that wall, the expansion channel is configured such that a two-phase flow arises in the course of the phase conversion of liquid CO2 into gaseous CO2 that takes place in the expansion channel, said CO2 liquid phase flowing annularly at the edge of the expansion channel and the CO2 gas phase flowing in a central region of the expansion channel, the change in cross-section in the transition (38a, 38b, 38c, 38d, 38e, 38f) brings about a pressure jump, as a result of which turbulences are generated in the flow within the expansion channel, which mixes up the CO2 liquid phase and the CO2 gas phase such that in the course of the intermixing of the gas and liquid phases, the liquid phase is accelerated by the faster flowing gas phase such that snow particles resulting from the accelerated liquid phase emerge from the outlet opening of the expansion channel at increased velocity.

2. The device (2) of claim 1, wherein the particular transition (38a, 38b, 38c, 38d, 38e, 38f) extends in the flow direction (14) over a length of from 0 mm to 5 mm.

3. The device (2) of claim 2, wherein the particular transition (38a, 38b, 38c, 38d, 38e, 38f) extends in the flow direction (14) over a length of from 0 mm to 4 mm.

4. The device (2) of claim 1, wherein the expansion channel (6) has a maximum cross-sectional area surface of less than 5.0 mm$^2$ on a plane orthogonal to the flow direction (14).

5. The device (2) of claim 4, wherein the expansion channel (6) has a maximum cross-sectional area surface of less than 3.0 mm$^2$ on a plane orthogonal to the flow direction (14).

6. The device (2) of claim 1, wherein the expansion channel (6) is formed by at least one cavity of a workpiece.

7. The device (2) of claim 6, wherein the expansion channel (6) is formed by a cylindrical tubular body (10).

8. The device (2) of claim 1, wherein the transition or transition region (38a, 38b, 38c, 38d, 38e, 38f) form a screen surface (52) oriented orthogonal to the flow direction (14) or inclined to the flow direction (14).

9. The device (2) of claim 1, wherein each said channel section (36a, 36b, 36c, 36d, 36e, 36f, 36g) widens conically in the flow direction (14).

* * * * *